US012352815B2

(12) United States Patent
Jinno et al.

(10) Patent No.: US 12,352,815 B2
(45) Date of Patent: Jul. 8, 2025

(54) BATTERY INFORMATION MANAGEMENT SYSTEM AND BATTERY INFORMATION MANAGEMENT METHOD

(71) Applicant: HONDA MOTOR CO., LTD., Tokyo (JP)

(72) Inventors: Tatsuya Jinno, Wako (JP); Takumi Shiiyama, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 340 days.

(21) Appl. No.: 17/889,767

(22) Filed: Aug. 17, 2022

(65) Prior Publication Data

US 2023/0003804 A1 Jan. 5, 2023

Related U.S. Application Data

(63) Continuation of application No. PCT/JP2021/007867, filed on Mar. 2, 2021.

(30) Foreign Application Priority Data

Mar. 27, 2020 (JP) ................................. 2020-057890

(51) Int. Cl.
*G01R 31/371* (2019.01)
*G01R 31/367* (2019.01)
(Continued)

(52) U.S. Cl.
CPC ......... *G01R 31/371* (2019.01); *G01R 31/367* (2019.01); *G01R 31/382* (2019.01);
(Continued)

(58) Field of Classification Search
CPC .. G01R 31/367; G01R 31/371; G01R 31/382; G06F 21/62; G06F 17/40; H01M 10/42;
(Continued)

(56) References Cited

U.S. PATENT DOCUMENTS 9,287,729 B2 * 3/2016 Nyu .......................... H02J 7/00
10,814,738 B2   10/2020 Kurimoto
(Continued)

FOREIGN PATENT DOCUMENTS

JP    2006-033198 A    2/2006
JP    2007-150449 A    6/2007
(Continued)

OTHER PUBLICATIONS

International Search Report and Written Opinion for PCT/JP2021/007867 mailed May 25, 2021.

*Primary Examiner* — John H Le
(74) *Attorney, Agent, or Firm* — Thomas Horstemeyer, LLP (57) ABSTRACT

A battery information management system, comprises: a battery; and a server that establishes communication with the battery via a network. The battery includes: a storage unit configured to store maintenance information for maintenance of the battery, user information related to personal data of a user of the battery, and usage history information of the battery; an information communication unit configured to transmit the user information and the usage history information from the storage unit to the server; and a control unit configured to control the storage unit and the information communication unit.

8 Claims, 4 Drawing Sheets

(51) Int. Cl.
 *G01R 31/382* (2019.01)
 *G06F 17/40* (2006.01)
 *H01M 10/42* (2006.01)

(52) U.S. Cl.
 CPC ........ *G06F 17/40* (2013.01); *H01M 10/4257* (2013.01); *H01M 2010/4278* (2013.01)

(58) Field of Classification Search
 CPC ............ H01M 10/48; H01M 10/4257; H01M 2010/4278; H01M 2220/20
 USPC .......................................................... 702/63
 See application file for complete search history.

(56) References Cited

U.S. PATENT DOCUMENTS

| | | | |
|---|---|---|---|
| 2007/0129049 A1 | 6/2007 | Endo et al. | |
| 2018/0308300 A1 | 10/2018 | Kurimoto | |
| 2020/0009983 A1* | 1/2020 | Oshima | B60L 53/80 |

FOREIGN PATENT DOCUMENTS

| | | |
|---|---|---|
| JP | 2010-114751 A | 5/2010 |
| JP | 2018-181323 A | 11/2018 |
| WO | 2021/192846 A1 | 9/2021 |

* cited by examiner

BATTERY INFORMATION MANAGEMENT SYSTEM AND BATTERY INFORMATION MANAGEMENT METHOD

CROSS-REFERENCE TO RELATED APPLICATION(S)

This application is a continuation of International Patent Application No. PCT/JP2021/007867 filed on Mar. 2, 2021, which claims priority to and the benefit of Japanese Patent Application No. 2020-057890 filed on Mar. 27, 2020, the entire disclosures of which are incorporated herein by reference.

BACKGROUND OF THE INVENTION

Field of the Invention

The present invention relates to a battery information management system and a battery information management method.

Description of the Related Art

Japanese Patent Laid-Open No. 2018-181323 discloses a technology related to an information collection system of a power storage device, which collects information on power storage devices respectively installed in a plurality of vehicles.

However, in recent years, it has been required to comply with personal data protection laws, and thus data needs to be cleared out when a vehicle is discarded and information remaining on each of devices in the vehicle contains personal data. Meanwhile, usage history information of a battery which is unrelated to the personal data is still valuable and is desired to be retrieved.

The present invention is intended to provide a battery information management technology capable of clearing user information and usage history information of a battery, which are related to personal data of a user of the battery, from a memory of the battery, and encrypting and managing the user information in a server after transmitting the user information and the usage history information to a server.

SUMMARY OF THE INVENTION

According to one aspect of the present invention, there is provided a battery information management system, comprising: a battery; and a server that establishes communication with the battery via a network; wherein the battery includes: a storage unit configured to store maintenance information for maintenance of the battery, user information related to personal data of a user of the battery, and usage history information of the battery; an information communication unit configured to transmit the user information and the usage history information from the storage unit to the server; and a control unit configured to control the storage unit and the information communication unit, wherein the control unit is configured to clear the user information and the usage history information from the storage unit after transmission processing by the information communication unit, wherein the server includes: an acquisition unit configured to acquire the user information and the usage history information transmitted by the information communication unit; a server storage unit configured to store the user information in a first storage area and the usage history information in a second storage area different from the first storage area, the user information and the usage history information being acquired by the acquisition unit; and an information management unit configured to manage information stored in the server storage unit, wherein the information management unit is configured to encrypt and manage the user information stored in the first storage area, wherein the battery is associated with the user information stored in the first storage area and the usage history information stored in the second storage area by means of individual identification information of the battery, wherein the battery information management system provides the user and the user's reusing product, in which the battery is reused, with the user information and the usage history information, associated with the battery by means of the individual identification information, such that those pieces of information are used by the user and the reusing product.

According to the present invention, it is possible to provide a battery information management technology capable of clearing user information and usage history information of a battery, which are related to personal data of a user of the battery, from a memory of the battery, and encrypting and managing the user information in a server after transmitting the user information and the usage history information to a server.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(Battery Information Management System)

Figure 1:
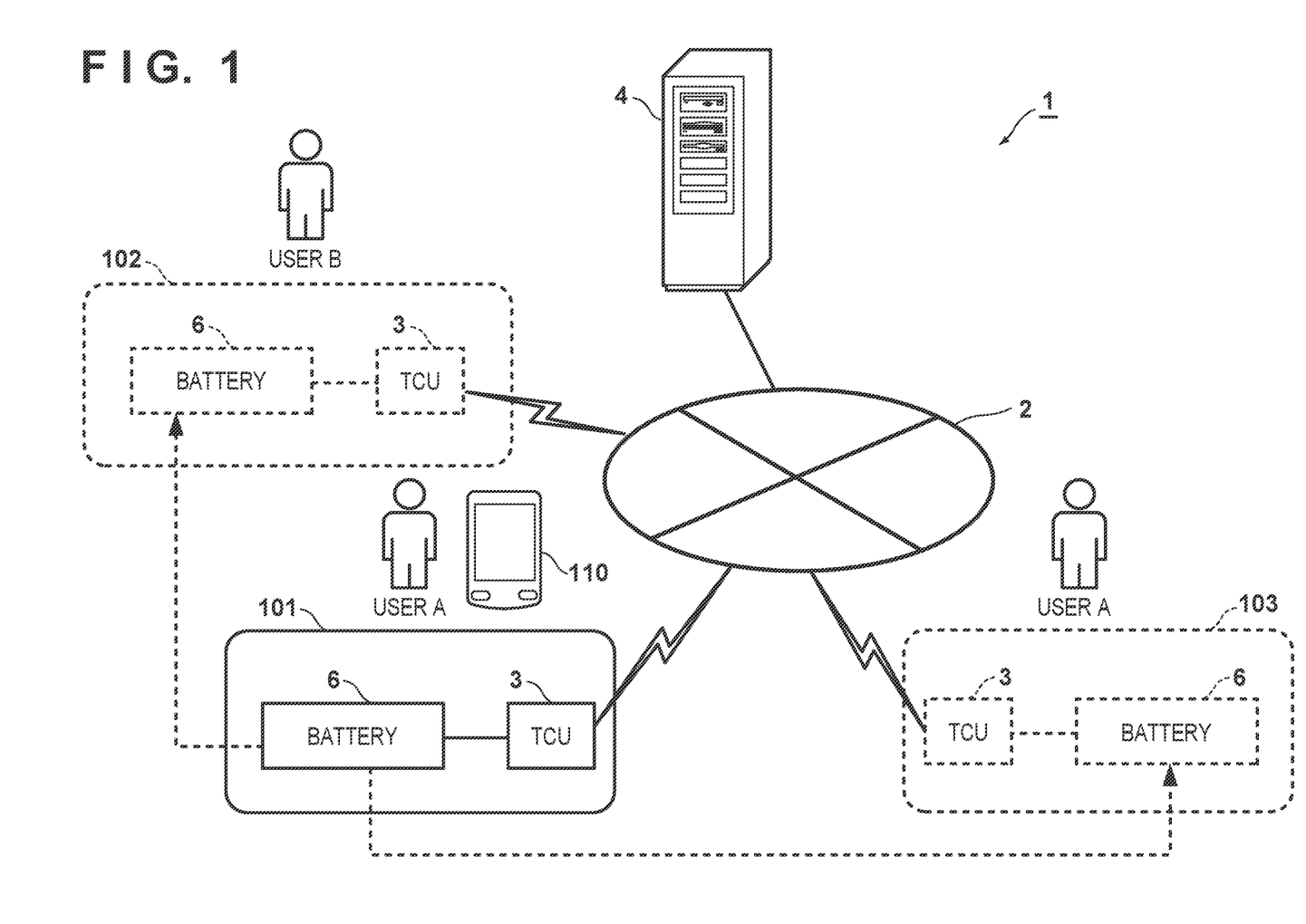
FIG. 1 is a block diagram illustrating a configuration of a battery information management system according to an embodiment.

FIG. 1 is a block diagram illustrating a configuration of a battery information management system 1 according to a representative embodiment of the present invention. The battery information management system 1 illustrated in FIG. 1 includes an information communication device 3 (telematics control unit: TCU) and a server (battery information management device) 4, which are communicatively connected via a network 2.

The information communication device 3 (TCU) can execute signal processing for establishing communication with the server 4 via the network 2. The information communication device 3 (TCU) is connected to a battery 6 (battery unit), and transmits information acquired from the battery 6 to the server 4 via the network 2. The information communication device 3 (TCU) is provided in, for example, a stationary power storage device operated by a solar or wind power plant; a working machine such as a lawn mower, a cultivator or a snow blower; a disaster-response storage battery; a residential storage battery; an electric motorcycle such as an electric scooter; an electric vehicle; or a hybrid vehicle.

A battery that is mounted on, for example, a vehicle traveling with an electric motor as a power source can be applied as a reusable battery to other reusing products. The reusable battery refers to a rechargeable secondary battery used as a power storage device, which is not suitable for being used in, for example, an electric motorcycle (such as an electric scooter), an electric vehicle, or a hybrid vehicle, because its storage capacity drops to or is below a predetermined amount, but can still be reused for other purposes. A representative example of the reusable battery is a lithium ion battery.

(Configuration of Battery)

Figure 2:
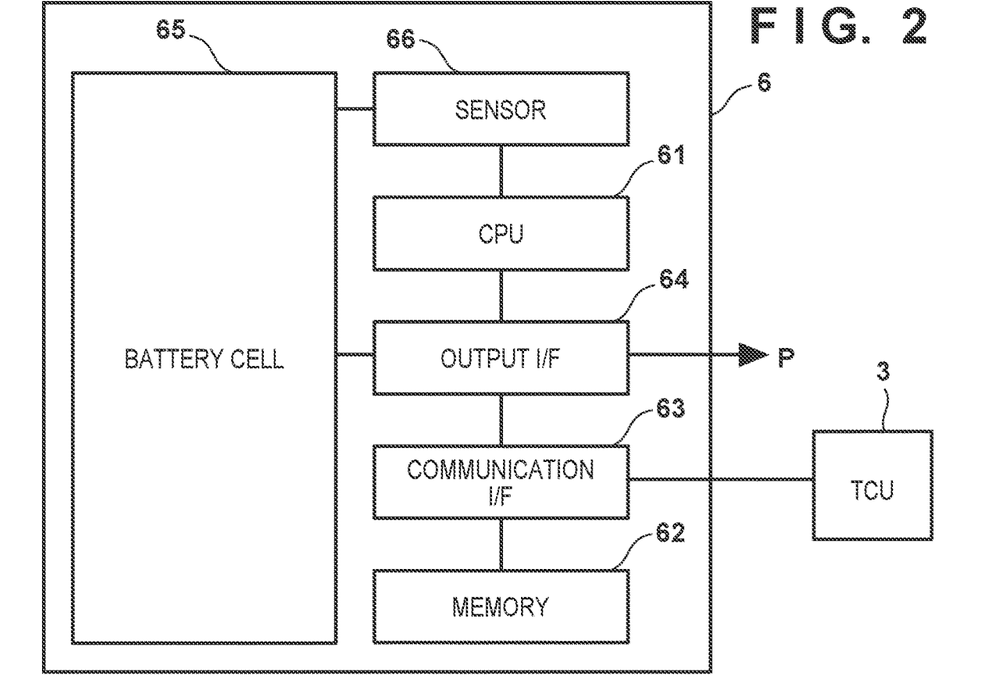
FIG. 2 is a block diagram illustrating a configuration of a battery.

FIG. 2 is a block diagram illustrating a configuration of the battery (battery unit). The battery has a plurality of cells made of a lithium (Li) ion battery as a battery cell 65. A sodium ion secondary battery or a potassium ion secondary battery can be used as a cell of the battery cell 65 in addition to the lithium (Li) ion battery.

Figure 4:
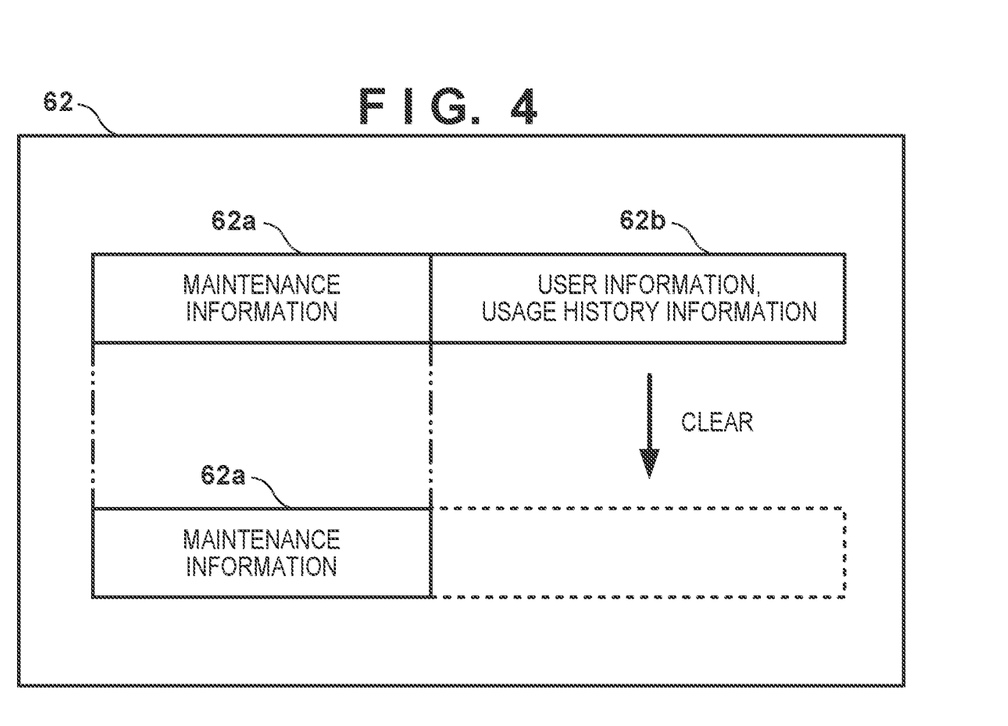
FIG. 4 is a diagram schematically illustrating a storage area of a memory in the battery.

As shown in FIG. 2, a discharge voltage, an output current and a cell temperature of the battery cell 65 are monitored by the sensor 66. Power P supplied from the battery cell 65 is supplied via an output I/F 64 (output interface) having an output terminal. A CPU 61 stores various physical quantity data measured by a sensor 66 in a memory 62 (storage unit). The memory 62 includes a ROM storing a control program for operating the CPU 61 and a RAM used as a work area for executing the control program. FIG. 4 is a diagram schematically illustrating a storage area of the memory 62 in the battery 6, and the memory 62 stores maintenance information for maintaining the battery (62a), user information related to personal data of a user of the battery, and usage history information of the battery (62b). The maintenance information includes data of the battery for, for example, maintenance, inspection or recovery from freezing.

A communication I/F 63 (communication interface) is an interface that connects the information communication device 3 (TCU) and the battery 6. The information communication device 3 (TCU) transmits information acquired from the memory 62 of the battery 6 to the server 4 via the communication I/F 63. The information communication device 3 (TCU) transmits the user information and the usage history information from the memory 62 to the server 4. The CPU 61 controls the memory 62 and the information communication device 3 (TCU), and clears the user information and the usage history information from the memory 62 after transmission processing by the information communication device 3 (TCU) as illustrated in FIG. 4. That is, the user information and the usage history information stored in the storage area 62b are cleared out. By clearing out the user information related to the personal data of the user of the battery 6, the user information is not left in the battery 6, and the personal data can be protected. The user information and the usage history information are transmitted to the server 4 and protected under information management of the server 4. The user information is protected by encryption, and the usage history information is managed such that the battery 6 can be used (secondary use) in a reusing product.

(Configuration of Server)

Figure 3:
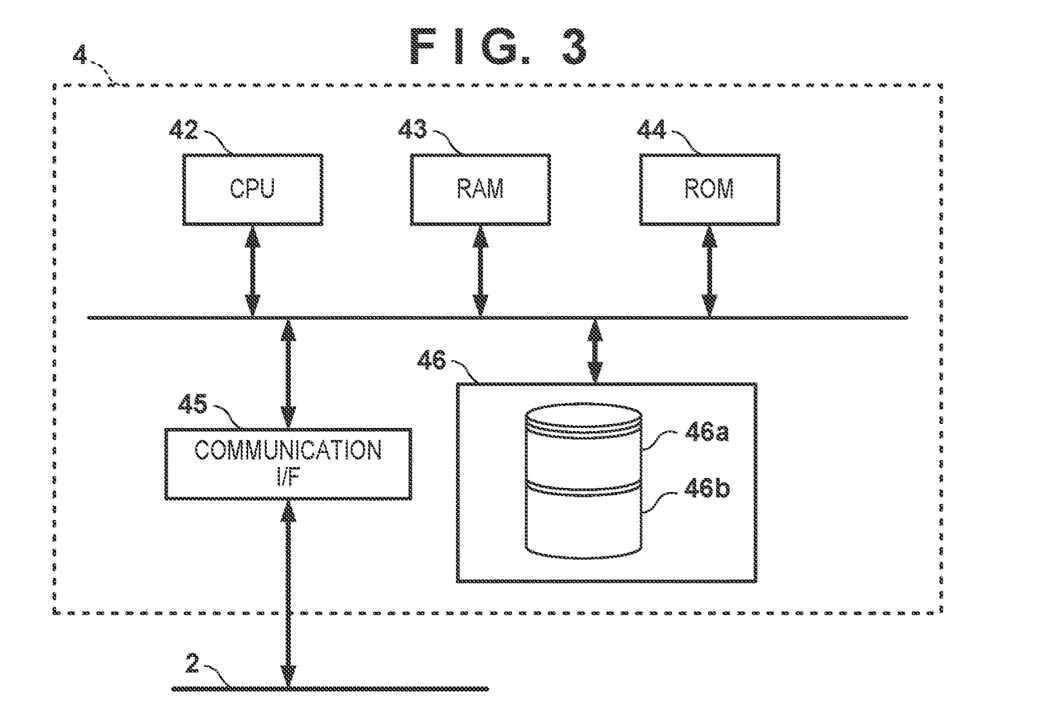
FIG. 3 is a block diagram illustrating a configuration of a server.

FIG. 3 is a block diagram illustrating a configuration of the server 4. As illustrated in FIG. 3, the server 4 includes a CPU 42 that executes and controls arithmetic processing in the server 4, a RAM 43, a ROM 44, a communication interface (I/F) 45, and a large-capacity storage device 46. The server 4 generates a database (46a, 46b in FIG. 3) of battery information based on the information transmitted from the information communication device 3 (TCU).

The server 4 can establish a communication link with the network 2 via the communication interface 45 and further, communicate with the information communication device 3 via the network 2. The server 4 acquires the user information related to personal data of the user of the battery and the usage history information of the battery via the network 2 via the communication interface 45. When the user information and the usage history information are acquired via the communication interface 45, the storage device 46 stores the user information in a first storage area 46a of the storage device 46 (server storage unit), and stores the usage history information in a second storage area 46b different from the first storage area. The CPU 42 functions as an information management unit that manages the information stored in the storage device 46 (server storage unit). The CPU 42 (information management unit) encrypts and manages the user information stored in the first storage area.

Figure 5:
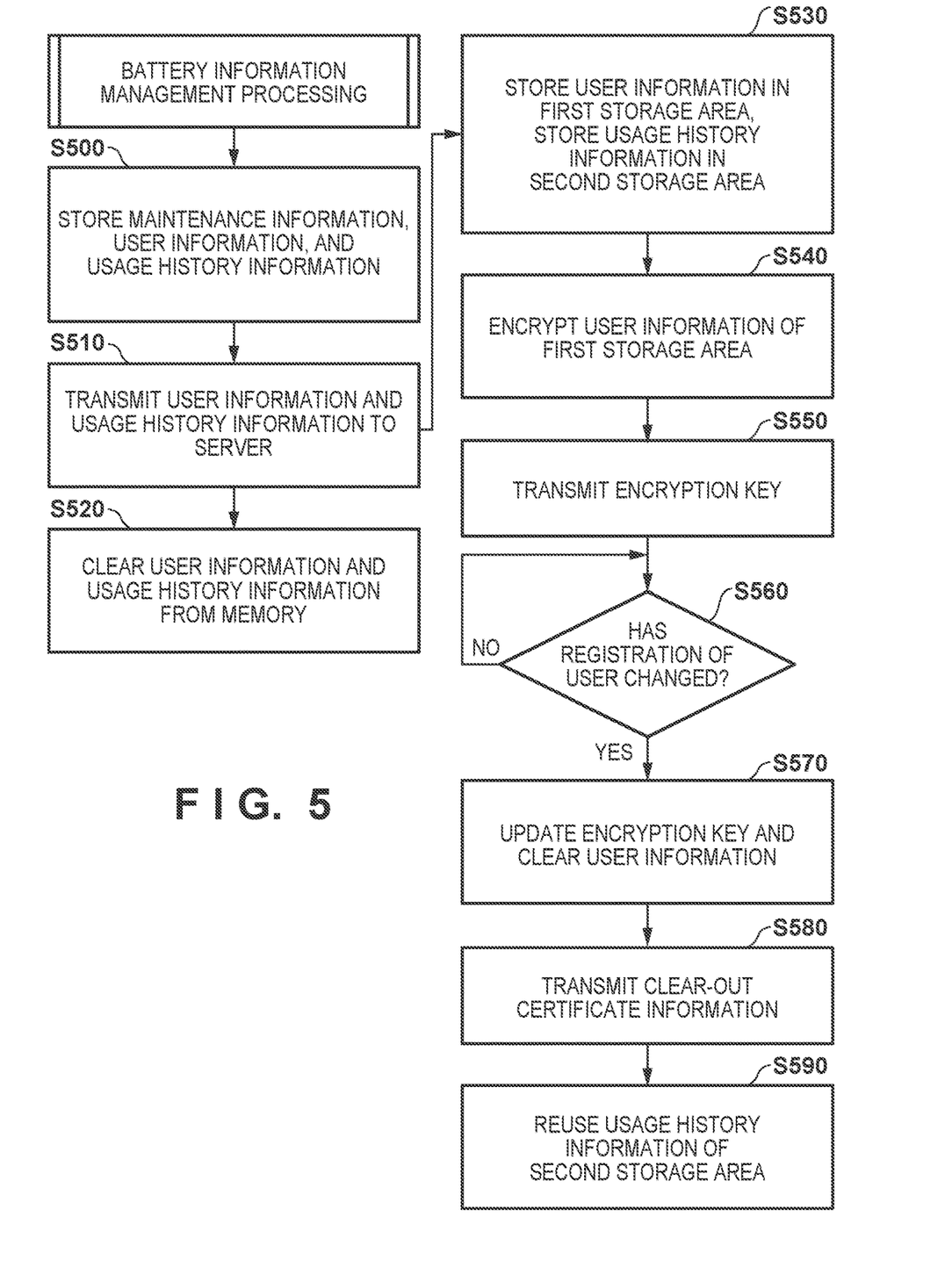
FIG. 5 is a diagram illustrating a flow of battery information management processing.

A flow of processing executed by the battery information management system 1 having the configuration described above will be described hereinbelow. FIG. 5 is a diagram illustrating a flow of battery information management processing in the battery information management system.

In step S500, the maintenance information for maintaining the battery, the user information related to personal data of the user of the battery, and the usage history information of the battery are stored in the memory 62 (62a, 62b).

In step S510, the information communication device 3 (TCU) transmits the user information and the usage history information from the memory 62 to the server 4.

In step S520, the CPU 61 clears the user information and the usage history information from the memory 62 after transmission processing by the information communication device 3 (TCU).

In step S530, when the user information and the usage history information are acquired via the communication interface 45, the storage device 46 of the server 4 stores the user information in the first storage area 46a of the storage device 46 (server storage unit), and stores the usage history information in the second storage area 46b different from the first storage area.

In step S540, the CPU 42 (information management unit) encrypts and manages the user information stored in the first storage area 46a.

In step S550, the CPU 42 (information management unit) transmits an encryption key for decrypting the encrypted user information to the user via the network 2. For example, as illustrated in FIG. 1, the encryption key is transmitted to a terminal 110 owned by the user A of the battery 6.

The battery 6 is mounted on, for example, a vehicle 101 (FIG. 1) that travels using an electric motor as a power source (corresponding to a battery-using product). In step S560, the CPU 42 (information management unit) determines whether user registration of the vehicle 101 has changed. In a case where the user registration has not been changed (NO in S560), the CPU 42 (information management unit) continues determination processing as to whether the user registration has changed.

On the other hand, in a case where it is determined that the user registration has changed in the determination processing of step S560 (YES in S560), the CPU 42 (information management unit) updates the encryption key and clears the user information stored in the first storage area 46a from the storage device 46 (server storage unit) in step S570. As a modified example, in a case where the user registration is changed from a user A of the vehicle 101 to a different user B, the CPU 42 (information management unit) updates the encryption key and clears the user information from the storage device 46 (server storage unit) such that the user B who is a current user cannot access the user information of the user A stored in the first storage area 46a of the storage device 46 (server storage unit).

In step S580, after clearing the user information from the storage device 46 (server storage unit), the CPU 42 (information management unit) transmits to the user clear-out certificate information proving that the user information has been cleared out. For example, as illustrated in FIG. 1, the clear-out certificate information is transmitted to the terminal 110 owned by the user A of the battery 6. Accordingly, the user A can confirm that the user information has been cleared out.

In step S590, the CPU 42 (information management unit) manages the usage history information in the second storage area 46b of the storage device 46 (server storage unit) such that the battery 6 can be used (secondary use) in a reusing product.

In a case where a user of the reusing product is changed, the CPU 42 (information management unit) associates the battery 6 with the usage history information stored in the second storage area 46b, by means of individual identification information of the battery 6.

After the user information is cleared from the storage device 46 (server storage unit), the usage history information associated by the individual identification information can be provided for the reusing product in which the battery 6 is reused.

For example, as illustrated in FIG. 1, in a case where the battery 6 used in the vehicle 101 (battery-using product) of the user A is reused in a reusing product 102 of the different user B, the CPU 42 (information management unit) provides the usage history information of the second storage area 46b associated by the individual identification information such that the usage history information can be used again (secondary use).

In a case where the user of the reusing product is not changed, the CPU 42 (information management unit) associates the battery 6 with the user information stored in the first storage area 46a and the usage history information stored in the second storage area 46b, by means of the individual identification information of the battery 6.

The user information and the usage history information, associated by the individual identification information, can be referred in the reusing product of the same user, in which the battery 6 is reused.

For example, as illustrated in FIG. 1, in a case where the battery 6 used in the vehicle 101 (battery-using product) of the user A is reused in a reusing product 103 of the same user A, the CPU 42 (information management unit) provides the user information of the first storage area 46a and the usage history information of the second storage area 46b, associated by the individual identification information, such that the user information and the usage history information can be used again (secondary use).

SUMMARY OF EMBODIMENTS

The embodiments disclose at least the battery information management system and the battery information management method as follows.

(Configuration 1) The battery information management system of the embodiment stated above is a battery information management system (for example, 1 in FIG. 1) including a battery (for example, 6 in FIG. 1); and a server (for example, 4 in FIG. 1) that establishes communication with the battery (6) via a network (for example, 2 in FIG. 1), wherein the battery (6) includes:

a storage unit (for example, 62, in FIG. 2) configured to store maintenance information for maintenance of the battery, user information related to personal data of a user of the battery, and usage history information of the battery;

an information communication unit (for example, 3, 63 in FIG. 2) configured to transmit the user information and the usage history information from the storage unit (62) to the server (4); and a control unit (for example, 61 in FIG. 2) configured to control the storage unit (62) and the information communication unit (3, 63), wherein the control unit (61) is configured to clear the user information and the usage history information from the storage unit (62) after transmission processing by the information communication unit (3, 63), wherein the server (4) includes:

an acquisition unit (for example, 45 in FIG. 3) configured to acquire the user information and the usage history information transmitted by the information communication unit;

a server storage unit (for example, 46 in FIG. 3) configured to store the user information in a first storage area (for example, 46a in FIG. 3) and the usage history information in a second storage area (for example, 46b in FIG. 3; different from the first storage area), the user information and the usage history information being acquired by the acquisition unit; and an information management unit (for example, 42 in FIG. 3) configured to manage information stored in the server storage unit (46), wherein the information management unit (42) is configured to encrypt and manage the user information stored in the first storage area (46a).

According to the battery information management system of Configuration 1, it is possible to provide a battery information management technology capable of clearing user information and usage history information of a battery, which are related to personal data of a user of the battery, from a memory of the battery, and encrypting and managing the user information in a server after transmitting the user information and the usage history information to a server. Accordingly, it is possible to reduce a load (labor) of initializing the information in the memory (storage unit) when the battery is reused.

(Configuration 2) In the battery information management system (for example, 1) according to the present embodiment, the information management unit (42) is configured to transmit an encryption key to the user via the network, and the encryption key is for decrypting the encrypted user information.

(Configuration 3) In the battery information management system (for example, 1) according to the present embodiment, the battery (6) is mounted on a vehicle (for example, 101 in FIG. 1) that travels using an electric motor as a power source, and the information management unit (42) is configured to update the encryption key in a case where user registration of the vehicle (101) is changed.

(Configuration 4) In the battery information management system (for example, 1) according to the present embodiment, the information management unit (42) is configured to clear the user information stored in the first storage area (46a) from the server storage unit (46) in a case where user registration of the vehicle (101) is changed.

According to the battery information management system of Configurations 2, 3 and 4, it is possible to enhance security management for protecting user information in the server.

(Configuration 5) In the battery information management system (for example, 1) according to the present embodiment, the information management unit (42) is configured to transmit to the user clear-out certificate information proving that the user information is cleared out after the user information is cleared from the server storage unit (46).

According to the battery information management system of Configuration 5, the user can confirm that the user information has been cleared out.

(Configuration 6) In the battery information management system (for example, 1) according to the present embodiment, the information management unit (42) is configured to:

associate the battery (6) with the usage history information stored in the second storage area (46b) by means of the individual identification information of the battery, and provide the usage history information associated by the individual identification information to be used in a reusing product (for example, 102 in FIG. 1) in which the battery is reused after the user information is cleared from the server storage unit.

According to the battery information management system of Configuration 6, it is possible to use (secondary use) the usage history information in the second storage area 46b of the storage device 46 (server storage unit) for a reusing product in which the battery 6 is reused. Accordingly, when the battery is reused, continuous information management can be made for the usage history information.

(Configuration 7) In the battery information management system (for example, 1) according to the present embodiment, the information management unit (42) is configured to:

associate the battery (6) with the user information stored in the first storage area (46a) and the usage history information stored in the second storage area (46b) by means of the individual identification information of the battery, and provide the user information and the usage history information, associated by the individual identification information, to be used in a reusing product (for example, 103 in FIG. 1) of the same user, in which the battery (6) is reused.

According to the battery information management system of Configuration 7, it is possible to use (secondary use) the user information in the first storage area 46a and the usage history information in the second storage area 46b, of the storage device 46 (server storage unit) for a reusing product in which the battery 6 is reused. Accordingly, when the battery is reused, continuous information management can be made for the user information and the usage history information.

(Configuration 8) The battery information management method of the embodiment stated above is a battery information management method which is adopted in a battery information management system (for example, 1 in FIG. 1) including a battery (for example, 6 in FIG. 1); and a server (for example, 4 in FIG. 1) that establishes communication with the battery (6) via a network (for example, 2 in FIG. 1), the method including:

a battery processing; and
a server processing,
wherein the battery processing includes:

storing maintenance information for maintenance of the battery, user information related to personal data of a user of the battery, and usage history information of the battery in a storage unit (for example, S500 in FIG. 5);

transmitting, by an information communication unit, the user information and the usage history information from the storage unit to the server (for example, S510 in FIG. 5); and controlling the storage unit and the information communication unit (for example, S520 in FIG. 5), wherein the controlling includes clearing the user information and the usage history information from the storage unit after transmission processing in the transmitting, wherein the server processing includes:

acquiring the user information and the usage history information transmitted by the information communication unit (for example, 45 in FIG. 3);

storing the user information in a first storage area of a server storage unit and the usage history information in a second storage area of the server storage unit, the second storage area being different from the firsts storage area, the user information and the usage history information being acquired in the acquiring (for example, S530 in FIG. 5); and managing information stored in the server storage unit (for example, S540 in FIG. 5), wherein the managing includes encrypting and managing the user information stored in the first storage area.

According to the battery information management method of Configuration 8, it is possible to provide a battery information management technology capable of clearing user information and usage history information of a battery, which are related to personal data of a user of the battery, from a memory of the battery, and encrypting and managing the user information in a server after transmitting the user information and the usage history information to a server.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A system, comprising:
a battery that is reusable by a plurality of users; and
a server that establishes communication with the battery via a network;
wherein the battery includes:
a storage unit configured to store maintenance information for maintenance of the battery, user information related to personal data of a first one of the users registered in association with a use of the battery, and usage history information of the battery;
an information communication unit configured to transmit the user information and the usage history information from the storage unit to the server; and
a control unit configured to control the storage unit and the information communication unit,
wherein the control unit is configured to clear the user information and the usage history information from the storage unit after transmission processing by the information communication unit when a user registration associated with the use of the battery is changed from the first one of the users to a second one of the users;
wherein the server includes:
an acquisition unit configured to acquire the user information and the usage history information transmitted by the information communication unit of the battery;

a server storage unit configured to store the user information in a first storage area and the usage history information in a second storage area different from the first storage area, the user information and the usage history information being acquired by the acquisition unit; and an information management unit configured to manage information stored in the server storage unit, wherein the information management unit is configured to encrypt and manage the user information stored in the first storage area, wherein the battery is associated with the user information stored in the first storage area and the usage history information stored in the second storage area by means of individual identification information of the battery, wherein the system provides the user information and the usage history information associated with the individual identification information, so that the user information and the usage history information are able to be used for a reusing battery product in which the battery is reused and which is used by the first one of the users who used the battery before the battery is used as the reusing battery product.

2. The system according to claim 1, wherein the information management unit is configured to transmit an encryption key to the first one of the users via the network, the encryption key for decrypting the encrypted user information.

3. The system according to claim 2, wherein the battery is mounted on a vehicle that travels using an electric motor as a power source, and the information management unit is configured to update the encryption key in a case where user registration of the vehicle is changed.

4. The system according to claim 3, wherein the information management unit is configured to clear the user information stored in the first storage area from the server storage unit in a case where user registration of the vehicle is changed.

5. The system according to claim 4, wherein the information management unit is configured to transmit to the first one of the users clear-out certificate information proving that the user information is cleared out after the user information is cleared from the server storage unit.

6. The system according to claim 4, wherein the information management unit is configured to:
associate the battery with the usage history information stored in the second storage area by means of the individual identification information of the battery, and
provide the usage history information associated by the individual identification information to be used in a reusing product in which the battery is reused after the user information is cleared from the server storage unit.

7. A method used in a system, wherein the system includes a battery that is reusable by a plurality of users and a server that establishes communication with the battery via a network, the method comprising:
a battery processing; and
a server processing,
wherein the battery processing includes:
storing maintenance information for maintenance of the battery, user information related to personal data of a first one of the users registered in association with a use of the battery, and usage history information of the battery in a storage unit;
transmitting, by an information communication unit, the user information and the usage history information from the storage unit to the server; and
controlling the storage unit and the information communication unit,
wherein the controlling includes clearing the user information and the usage history information from the storage unit after transmission processing in the transmitting when a user registration associated with the use of the battery is changed from the first one of the users to a second one of the users;
wherein the server processing includes:
acquiring the user information and the usage history information transmitted by the information communication unit of the battery;
storing the user information in a first storage area of a server storage unit and the usage history information in a second storage area of the server storage unit, the second storage area being different from the first firsts-storage area, the user information and the usage history information being acquired in the acquiring; and
managing information stored in the server storage unit,
wherein the managing includes encrypting and managing the user information stored in the first storage area,
wherein the battery is associated with the user information stored in the first storage area and the usage history information stored in the second storage area by means of individual identification information of the battery,
wherein the method includes providing the user information and the usage history information associated with the individual identification information, so that the user information and the usage history information are able to be used for a reusing battery product in which the battery is reused and which is used by the first one of the users who used the battery before the battery is used as the reusing battery product.

8. A non-transitory computer-readable storage medium storing a program causing, when read and executed by a computer, the computer to execute a method comprising:
storing maintenance information for maintenance of a battery, user information related to personal data of a first one of a plurality of users registered in association with a use of the battery, and usage history information of the battery in a storage unit, wherein the battery is reusable by the users, and a server establishes communication with the battery via a network;
transmitting, by an information communication unit, the user information and the usage history information from the storage unit to the server; and
controlling the storage unit and the information communication unit,
wherein the controlling includes clearing the user information and the usage history information from the storage unit after transmission processing in the transmitting when a user registration associated with the use of the battery is changed from the first one of the users to a second one of the users;
wherein the server processing includes:
acquiring the user information and the usage history information transmitted by the information communication unit of the battery;
storing the user information in a first storage area of a server storage unit and the usage history information in a second storage area of the server storage unit, the second storage area being different from the first storage area, the user information and the usage history information being acquired in the acquiring; and managing information stored in the server storage unit, wherein the managing includes encrypting and managing the user information stored in the first storage area, wherein the battery is associated with the user information stored in the first storage area and the usage history information stored in the second storage area by means of individual identification information of the battery, wherein the method includes providing the user information and the usage history information associated with the individual identification information so that the user information and the usage history information are able to be used for a reusing battery product in which the battery is reused and which is used by the first one of the users who used the battery before the battery is used as the reusing battery product.

* * * * *